(12) United States Patent
Venkataraman

(10) Patent No.: US 8,265,583 B1
(45) Date of Patent: Sep. 11, 2012

(54) BLIND COMPENSATION FOR ARBITRARY RECEIVER NONLINEARITIES VIA A DIGITAL SIGNAL PROCESSING APPROACH

(75) Inventor: Jagadish Venkataraman, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 891 days.

(21) Appl. No.: 12/211,642

(22) Filed: Sep. 16, 2008

Related U.S. Application Data

(60) Provisional application No. 60/972,995, filed on Sep. 17, 2007.

(51) Int. Cl.
*H04B 1/10* (2006.01)
*H04B 17/00* (2006.01)

(52) U.S. Cl. ..................... 455/296; 455/67.13
(58) Field of Classification Search ............... 455/63.1, 455/67.13, 570, 114.1, 114.2, 181.1, 226.3, 455/283, 284, 296, 306
See application file for complete search history.

(56) References Cited

U.S. PATENT DOCUMENTS

| 5,412,691 | A  | * | 5/1995 | Ginzburg et al. | 375/296 |
| 6,621,851 | B1 | * | 9/2003 | Agee et al. | 375/130 |
| 6,798,843 | B1 | * | 9/2004 | Wright et al. | 375/296 |
| 7,587,171 | B2 | * | 9/2009 | Evans et al. | 455/63.1 |
| 7,860,476 | B1 | * | 12/2010 | Karr et al. | 455/296 |
| 7,863,556 | B2 | * | 1/2011 | Hidalgo et al. | 250/281 |
| 2004/0174943 | A1 | * | 9/2004 | Agarwal et al. | 375/346 |
| 2008/0299932 | A1 | * | 12/2008 | Belogolovy et al. | 455/296 |

* cited by examiner

*Primary Examiner* — Andrew Wendell
*Assistant Examiner* — Cindy Trandai

(57) ABSTRACT

A method of compensating for arbitrary nonlinearities associated with a received signal includes receiving a plurality of samples of the signal having at least one in-band region and at least one out-of-band region, generating a plurality of compensated signal values based on the plurality of samples and a plurality of respective compensation values, applying a transform function to the plurality of compensated signal values to generate a frequency-domain representation of the plurality of compensated signal values, and updating at least one of the plurality of compensation values using the generated frequency-domain representation of the signal to reduce energy associated with the at least one out-of-band region of the signal.

31 Claims, 7 Drawing Sheets

BLIND COMPENSATION FOR ARBITRARY RECEIVER NONLINEARITIES VIA A DIGITAL SIGNAL PROCESSING APPROACH

CROSS REFERENCE TO RELATED APPLICATION

This application claims the benefit of U.S. Provisional Patent App. No. 60/972,995 entitled "A Blind Compensation Scheme for Arbitrary Receiver Nonlinearities Via a Digital Signal Processing Innovation," filed Sep. 17, 2007, the disclosure of which is hereby expressly incorporated herein by reference.

FIELD OF TECHNOLOGY

The present disclosure relates generally to processing signals and, more particularly, to compensating for nonlinearities in a received signal.

BACKGROUND

Various front-end components of wireless receiver systems, such as low-noise amplifiers or mixers, frequently introduce nonlinearities into the received signals, which manifest themselves in adjacent frequency bands. Because nonlinearities result in a lower Signal-to-Noise Ratio (SNR) of the received signal, receiver systems often include dedicated components designed to compensate for these nonlinearities prior to demodulating and decoding the received signal.

Some existing compensation schemes assume the transmission of a pilot sequence to estimate nonlinearity. However, in many applications, it is impossible or impracticable to send pilot signals which a receiver system may use to construct the corresponding nonlinearity model. Accordingly, it is extremely difficult to compensate for nonlinearities in such systems.

Additionally, some conventional approaches to compensating nonlinearities rely on a Volterra-series model of nonlinearity and require that the coefficients of the Volterra-series inverse be determined. As the order of nonlinearities increases, these approaches quickly grow in complexity. Further, the inclusion of memory effects in a Volterra-series approach would cause an exponential increase in complexity.

SUMMARY

In one embodiment, a method of compensating for arbitrary nonlinearities associated with a received signal includes receiving a plurality of samples of the signal having at least one in-band region and at least one out-of-band region, generating a plurality of compensated signal values based on the plurality of samples and a plurality of respective compensation values, applying a transform function to the plurality of compensated signal values to generate a frequency-domain representation of the plurality of compensated signal values, and updating at least one of the plurality of compensation values using the generated frequency-domain representation of the signal to reduce energy associated with the at least one out-of-band region of the signal.

In another embodiment, an apparatus includes a compensator to apply a plurality of compensation values to a block of signal samples to generate a block of compensated signal samples, and an update module to adjust the plurality of compensation values based on the block of compensated signal samples to minimize energy of the compensated signal samples in an out-of-band region while maintaining energy of the compensated signal samples in an in-band region.

In another embodiment, an apparatus includes means for applying a plurality of compensation values to a plurality of respective signal samples to generate a plurality of compensated signal samples, and means for adjusting the plurality of compensation values using the plurality of compensated signal samples to minimize energy of the compensated signal samples in an out-of-band region while maintaining energy of the compensated signal samples in an in-band region.

DETAILED DESCRIPTION

Figure 1:
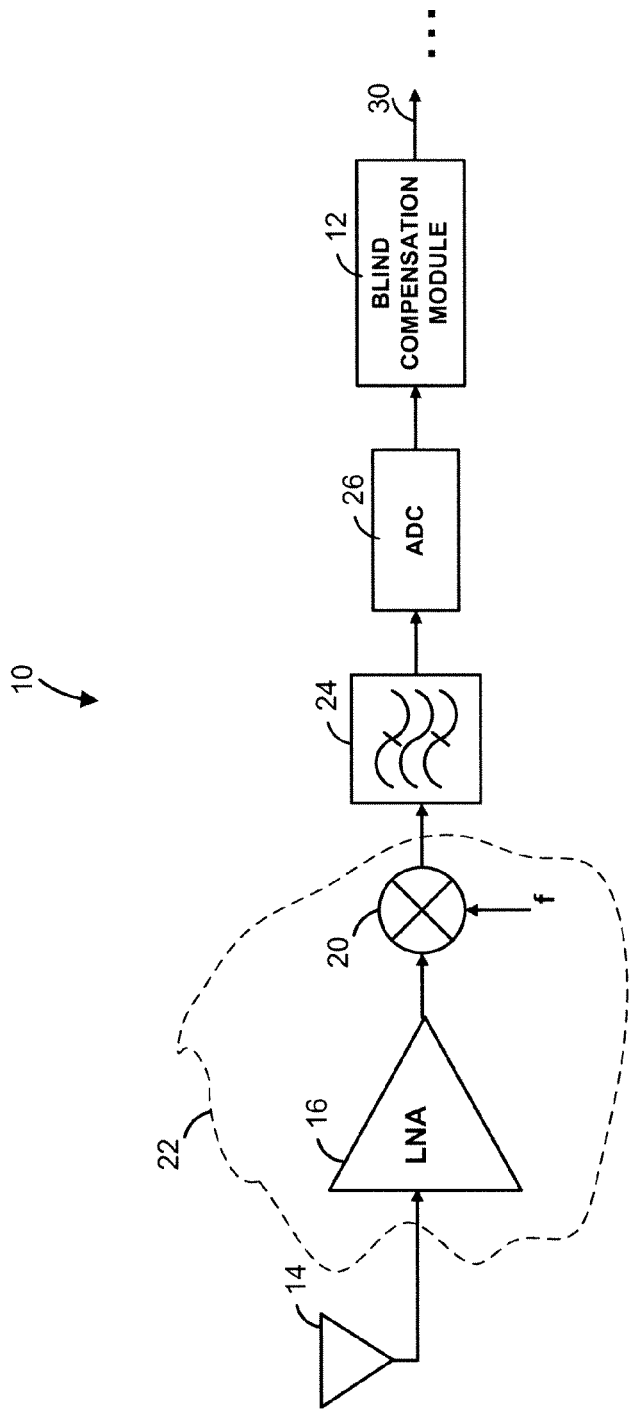
FIG. 1 is a block diagram of a front-end system of a receiver that includes a blind compensation module to compensates for receiver nonlinearities.

FIG. 1 is a block diagram of a front-end 10 of a receiver in which one or several components introduce nonlinearities into a received signal, and in which a blind compensation module 12 uses a digital signal processing (DSP) approach to compensate for these nonlinearities. The front-end 10 may be a part of a television receiver, a portable device such as a mobile phone or personal media player, a radio, or any other type of device capable of at least receiving wireless signals. In the example embodiment illustrated in FIG. 1, the front-end 10 includes an antenna 14 to receive waves in the radio band of the electromagnetic spectrum. However, it is contemplated that the blind compensation module 12 may also be used in receiver systems operating in other parts of the spectrum. Moreover, some of embodiments of the front-end 10 may receive communication signals via a wire, for example, and accordingly may not require an antenna.

In operation, the antenna 14 receives a radio signal transmitted from one or several signal sources such as a television broadcast antenna, a base station operating as a cellular infrastructure component, a base station operating according to the IEEE 802.11 family of standards or the 802.16 family of standards, a portable wireless device, etc. Because the received radio signal may be weak, the front-end receiver system may include a low-noise amplifier (LNA) 16 coupled to the antenna 14. Additionally or alternatively, the front-end receiver system 10 may include a frequency mixer 20, for example, or another nonlinear component. In FIG. 1, one or more of the LNA 16, the frequency mixer 20, or other components not shown, may introduce nonlinearities to the received radio signal, and are generally illustrated as a nonlinearity source 22.

As discussed above, it is often impossible or impracticable to transmit pilot data sequences from the signal source. Accordingly, the front-end 10 need not (but optionally may, in addition) rely on pilot-based training when compensating for the contributions of the nonlinearity source 22. Instead, the front-end 10 determines compensation parameters "on the fly," or as the antenna 14 receives a signal. This type of nonlinear compensation in the absence of pilot sequences is referred to herein as "blind compensation." More specifically, the blind compensation module 12 operates with digitized samples of the received signal having nonlinearities to minimize the out-of-band energy of the received signal while maintaining the in-band energy at a constant level. To this end, the blind compensation module 12 retrieves compensation values from a look-up table for each of the digitized samples, transforms blocks of digitized, compensated samples to frequency domain, and re-populates or updates some or all of the entries of the look-up table based on the frequency-domain representation of the compensated samples in an attempt to minimize the energy within the out-of-band region.

To perform blind compensation, the blind compensation module 12 is configured with data indicating the boundaries of the in-band and out-of-band regions of the received radio signal. For example, the Nyquist band of a certain signal may span fifty megahertz but the bandwidth of the signal may include only a five-megahertz region within the Nyquist band. In this example, the five-megahertz bandwidth may be considered to be the in-band region of the signal while the Nyquist band frequencies below or above the in-band region may define the out-of-band region of the signal. In other implementations, the dominant nonlinearities of a signal may only occur in the regions of second and third harmonics, for example, and the locations of these harmonics in the Nyquist band may be known (e.g., derivable from the known center frequency of the signal and the known bandwidth of the signal). In some implementations, to simplify the processing of nonlinearities, the blind compensation module 12 may associate the out-of-band region with only the regions of the second and third harmonics, and may consider the rest of the Nyquist band to be the in-band region. Thus, neither the in-band region nor the out-of-band region need be restricted to a single continuous band.

The blind compensation module 12 uses a DSP approach to adjust each digitized sample according to a corresponding entry in a look-up table, and to dynamically update the look-up table using the newly processed samples. To this end, the front-end 10 includes a low-pass filter (LPF) 24 and an analog-to-digital converter (ADC) 26. The ADC 26 converts the filtered continuous analog signal received from the antenna 14 and output, with possible nonlinearities, by the source 22 to digital signal samples. The blind compensation module 12 may operate on blocks of digital samples. For example, each block may include N samples processed in one iteration of a continuous scheme implemented by the blind compensation module 12. After the blind compensation module 12 compensates for the nonlinearities in some or all of the N samples and outputs the compensated samples via an output 30, the device including the front-end 10 may continue to process the compensated and digitized signal (e.g., demodulate, decode, etc.).

Figure 2:
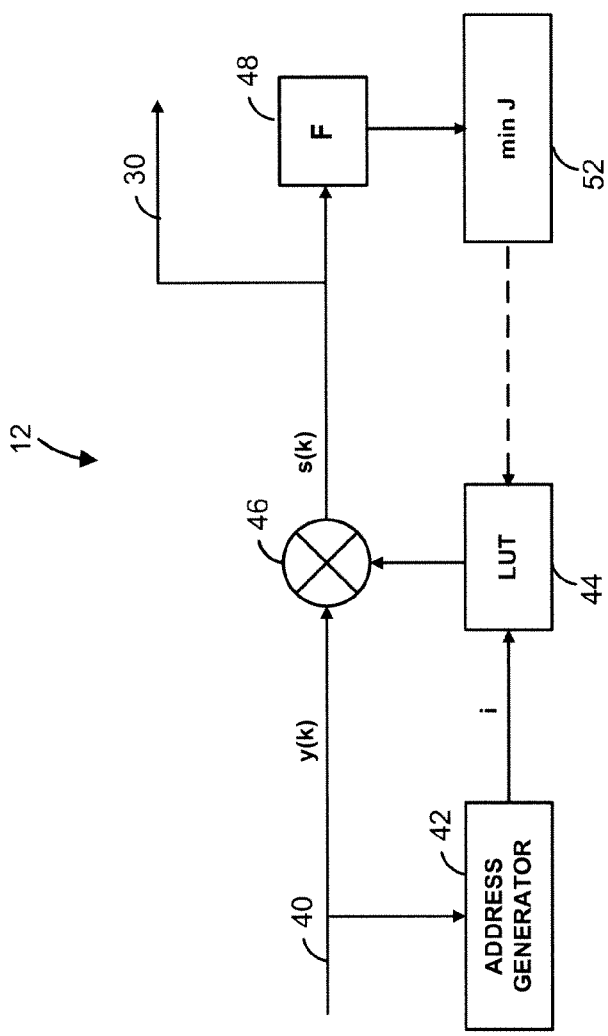
FIG. 2 is a block diagram of an example blind compensation module of FIG. 1.

FIG. 2 is a block diagram of an example of the blind compensation module 12. The blind compensation module 12 may receive digitized samples y(k) from the ADC 26 via an input 40. For each sample y(k), an address generator 42 generates an address or look-up table index $i_k$ which the blind compensation module 12 uses to retrieve a compensation factor δ(k) from a look-up table (LUT) 44. In other words, the blind compensation module 12 uses the following mapping:

$$y(k) \mapsto i_k \mapsto \delta(k)$$

An operator 46 then adjusts each sample y(k) using the corresponding compensation factor δ(k) to generate a compensated value s(k). More specifically, each adjusted sample is equal to (1+δ(k))y(k). The compensated values s(k) may define the output 30 of the blind compensation module 12. As indicated above, the output 30 may be processed by demodulation and/or decoding and/or other receiver components in later stages of the receiver.

Next, the blind compensation module 12 applies a transform function 48 to a block of compensated values $s(k_1)$, $s(k_2)$, $s(k_N)$ to generate a frequency-domain representation of the block. In general, the transform function 48 may be a discrete time Fourier Transform (DTFT), a Fast Fourier Transformn (FFT), or another transform suitable for the particular implementation. If, for example, the samples y(k) correspond to a real-valued Intermediate Frequency (IF) signal, the transform function 48 may be a Discrete Cosine Transform (DCT) having only real components.

Additionally, a LUT update module 52 may update, or re-train, the LUT 44 based on the values $s(k_1)$, $s(k_2)$, $s(k_N)$ as will be described below. In an initial state of the blind compensation module 12, each δ(k) value in the LUT 44 may be set to zero or some other value suitable for the particular implementation. The blind compensation module 12 modifies or adjusts the δ(k) values as the front-end 10 operates on a received signal. It will be noted that because the address generator 42 may map several digitized samples y(k) in a certain block of digitized samples to the same entry of the LUT 44, the blind compensation module 12 may process multiple blocks of digitized samples before each entry in the LUT 44 acquires a non-zero value δ(k). However, even after the blind compensation module 12 adjusts each entry in the LUT 44, the LUT update module 52 is applied to the frequency-domain transform of each new block of s(k) values to update or re-train the LUT 44. In this sense, the blind compensation module 12 continually trains the LUT 44 using new data.

It will be appreciated that the blind compensation module 12 may be implemented using hardware components, software components, or both. Further, it will be noted that while FIG. 2 illustrates separate elements 40-52, some or all of the elements 40-52 may be combined into a single component or otherwise packaged into one or several separate modules. For example, the transform function 48 may be a set of software instructions executed by a computer processor such as a general purpose processor or a special processor (e.g., a DSP processor). Further, the LUT 44 may be implemented in any type of suitable memory (e.g., RAM, CAM, TCAM, etc.).

Figure 3:
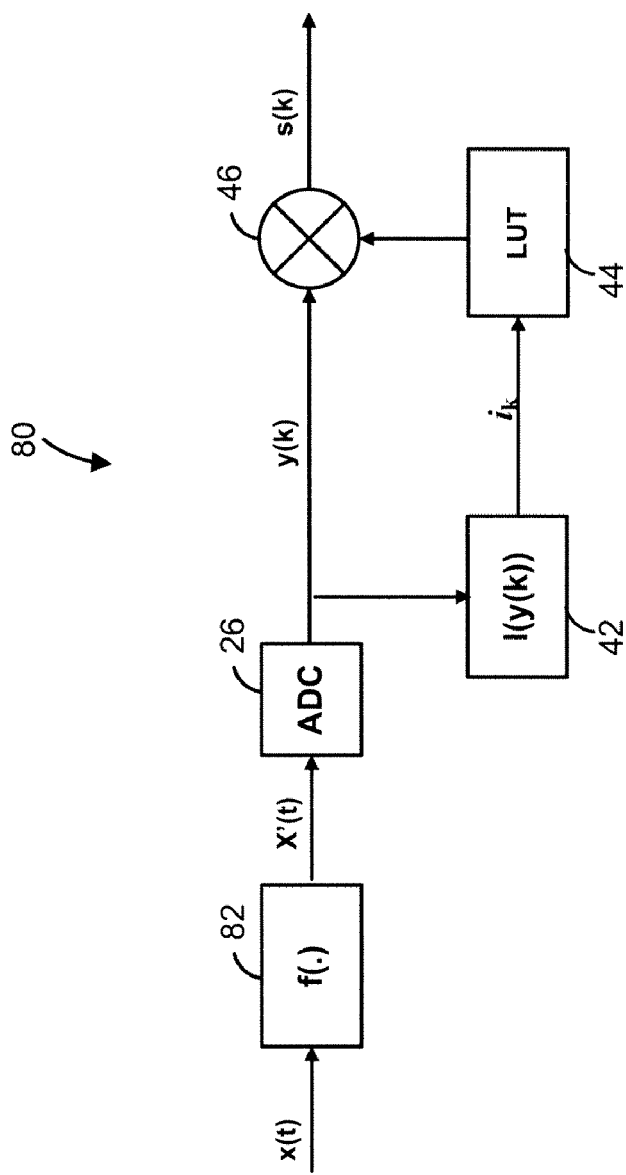
FIG. 3 is a schematic representation of a mathematical model implemented by the blind compensation module that may be used in a front-end system such as the front-end system of FIGS. 1 and 2.

FIG. 3 is a block diagram of one example of a mathematical model 80 corresponding to a front-end such as the front-end 10. According to the model 80, x(t) is a continuous signal received by an antenna such as the antenna 14; f( ) is a nonlinear transformation 82 of the signal x(t) corresponding to a nonlinearity source such as the nonlinearity source 22 (see FIG. 1); x'(t) is the nonlinearly transformed signal x(t);

y(k) is a discrete sampled output including the nonlinear contributions from the nonlinearity source 22 and digitized by the ADC 26; I(y(k)) is an address-generation function of the address generator 42 generating table indexes $i_k$; and s(k) is a discrete-time output of the blind compensation module 12, compensated for the nonlinearities according to the current compensation values stored in the LUT 44. In a vector/matrix form, a block of N of digitized samples y(0), y(1), ... y(N−1) can be represented by a matrix Y; a vector of compensation values δ(0), δ(1), ... δ(N−1) corresponding to the block of digitized samples y(0), y(1), ... y(N−1), may be expressed as a vector 6; a vector of compensated digitizes samples s(0), s(1), s(N−1) may be expressed s; and, finally, a vector representation of the mathematical model 80 may use the unity vector 1:

$$Y = \begin{bmatrix} y(0) & 0 & 0 & \ldots & 0 \\ 0 & y(1) & 0 & \ldots & 0 \\ \vdots & \ldots & \ldots & \ldots & \ldots \\ 0 & 0 & \ldots & 0 & y(N-1) \end{bmatrix},$$

$$\underline{\delta} = \begin{bmatrix} \delta(0) \\ \delta(1) \\ \vdots \\ \delta(N-1) \end{bmatrix}, s = \begin{bmatrix} s(0) \\ s(1) \\ \vdots \\ s(N-1) \end{bmatrix}, 1 = \begin{bmatrix} 1 \\ 1 \\ \vdots \\ 1 \end{bmatrix}.$$

Thus, the output vector s corresponding to the block of N compensated digitized samples is given by:

$$s = Y(1+\underline{\delta}) = y + Y\underline{\delta}$$

Merely for the purposes of explanation and clarity, the transformation of digitized sampled into the frequency domain is discussed below in terms of a Discrete Cosine Transform (DCT). However, it will be appreciated that other transforms may be used as well. In one particular embodiment, the DCT may be represented by a square matrix D:

$$D = \begin{bmatrix} D_{11} & D_{12} & \ldots & D_{1N} \\ D_{21} & D_{22} & \ldots & D_{21} \\ \vdots & \ldots & \ldots & \ldots \\ D_{N1} & D_{N2} & \ldots & D_{NN} \end{bmatrix}, \text{ where } D_{i,j} = \cos(\pi(i-1/2)(j-1)/N)$$

Thus, each coefficient D, is a real number. A vector form of the frequency-domain transform of the compensated digitized samples s(k) is then given by:

$$d = Ds \quad \text{(Equation 1)}$$

As discussed above, the blind compensation module 12 or another component of the front-end 10 is aware of the boundaries of the in-band and out-of-band regions of the signal x(t). In some embodiments, the front-end 10 may store these boundaries in a dedicated memory unit (not shown). In other embodiments, a single memory unit may store both the LUT 44 and a set of values defining the in-band and out-of-band regions for a particular signal x(t). Moreover, the front-end 10 may store several definitions of in-band and out-of-band regions for various center frequencies and/or bandwidths of the signal x(t). In particular, if the front-end 10 is a part of a broadcast radio or TV tuner, for example, the blind compensation module 12 may be configured with several sets of in-band and out-of-band region definitions to properly compensate for nonlinearities associated with various carrier frequencies of the signal x(t) corresponding to different broadcast channels.

In accordance with the vector representation of the mathematical model 80 discussed above, the in-band and out-of-band regions corresponding to the vector d may be represented by:

$$d_{IB} = D_{IB}s = \begin{bmatrix} d_{n_1} \\ d_{n_1+1} \\ \vdots \\ d_{n_2} \end{bmatrix}, \quad \text{(Equation 2)}$$

$$\text{and } d_{OOB} = D_{OOB}s = \begin{bmatrix} d_1 \\ \vdots \\ d_{n_1-1} \\ d_{n_2+1} \\ \vdots \\ d_N \end{bmatrix}, \quad \text{(Equation 3)}$$

respectively, where $n_1$ and $n_2$ are DCT points corresponding to the respective lower and upper of the in-band region of the signal x(t).

Referring again to FIG. 2, to compensate for the nonlinearities in the signal y(k), the blind compensation module 12 may seek to minimize a cost function to determine the updates for the LUT 44 in view of the vector d for each or some of the N-sized blocks of digitized signal samples. In particular, the blind compensation module 12 may attempt to minimize the out-of-band energy of the signal y(k) while maintaining the in-band energy of the signal y(k) at a constant level. For example, the LUT update module 52 may seek to minimize the cost function:

$$\min J = \|D_{OOB}s\|^2, \quad \text{(Equation 4)}$$

subject to the constraint that $\|D_{IB}s\|^2 = \|D_{IB}y\|^2 \Rightarrow \|D_{IB}Y\underline{\delta}\|^2 = 0$ In other words, minimizing the cost function attempts to ensure that the amount of energy within the in-band region of the signal y(k) before compensation (i.e., $D_{IB}y$) is the same as the amount of energy corresponding to the same block of N samples after compensation (i.e., $D_{IB}s$). To accommodate this constraint, the cost function may be modified as follows:

$$\min J = \|D_{OOB}s\|^2 + \lambda \|D_{IB}Y\underline{\delta}\|^2, \quad \text{(Equation 5)}$$

where λ is the Lagrange parameter.

To derive a form of the cost function convenient for iterative training of the LUT 44, the following terms may be additionally defined: $\Psi_{OOB} = D_{OOB}^T D_{OOB}$ and $\Psi_{IB} = D_{IB}^T D_{IB}$. Upon expansion, the cost function becomes:

$$\min J = 1^T Y^T \Psi_{OOB} Y 1 + 1^T Y^T \Psi_{OOB} Y\underline{\delta} + \underline{\delta}^T Y^T \Psi_{OOB} Y 1 + \underline{\delta}^T Y^T \Psi_{OOB} Y\underline{\delta} + \underline{\delta}^T Y^T \Psi_{IB} Y\underline{\delta} \quad \text{(Equation 6).}$$

Applying the Least Mean Squares (LMS) algorithm, an iterative approach can be utilized in which minimizing the cost function can be implemented iteratively:

$$\underline{\delta}^n = \underline{\delta}^{n-1} - \mu\left(\frac{\partial J}{\partial \underline{\delta}}\right) \Rightarrow \quad \text{(Equation 7)}$$

-continued
$$\underline{\delta}^n = \underline{\delta}^{n-1} - 2\mu Y^T \Psi_{OOB} Y(\underline{1} + \underline{\delta}^{n-1}) - 2\mu\lambda Y^T \Psi_{IB} Y \underline{\delta}^{n-1},$$

where $\mu$ is a step size parameter that can be selected depending on the particular implementation. It is contemplated that other iterative techniques may be used as well.

When the blind compensation module 12 updates the LUT 44 in accordance with the scheme set forth above, it is likely that multiple elements of the vector y are mapped to the same entry of the LUT 44. Accordingly, the blind compensation module 12 may accommodate an additional constraint that each entry of the LUT 44 may be updated no more than once during every iteration of the training procedure (i.e., for every block of N samples of y(k)). In other words, if $i_j \mapsto \delta(j)$ and $i_k \mapsto \delta(k)$ such that $i_j = i_k$, j<k, the update scheme for $\underline{\delta}^n$ operates only on the $j^{th}$ element of $\underline{\delta}$.

Thus, by applying the update scheme such as described above, the blind compensation module 12 compensates for arbitrary nonlinearities introduced into the signal y(k) without having to rely on a pilot training signal. Further, it will be noted that although the example discussed above illustrates a single in-band region and two out-of-band regions on either side of the in-band region within the Nyquist band, the blind compensation module 12 may similarly operate if in-band and the out-of-band regions are associated with one or more frequency bands defined in another manner. For example, if the dominant nonlinearities occur in the regions of the second and the third harmonics, the vectors $d_{IB}$ and $d_{OOB}$ may be given by:

$$d_{IB} = D_{IB}s = \begin{bmatrix} d_1 \\ \vdots \\ d_{n_1-1} \\ d_{n_2+1} \\ \vdots \\ d_{n_3-1} \\ d_{n_4+1} \\ \vdots \\ d_N \end{bmatrix}, \text{ and } d_{OOB} = D_{OOB}s = \begin{bmatrix} d_{n_1} \\ \vdots \\ d_{n_2} \\ d_{n_3} \\ \vdots \\ d_{n_4} \end{bmatrix},$$

where the range $[n_1, n_2]$ corresponds to DCT points representing the second harmonic region and the range $[n_3, n_4]$ corresponds to the DCT points representing the third harmonic region. By minimizing energy in the harmonics regions rather than in the entire Nyquist band excluding the in-band region, the blind compensation module 12 may save processing power and/or memory, for example. It will be appreciated that this scheme may be similarly expanded to include additional regions of dominant harmonics, if such are known. In general, any desired configuration of $D_{OOB}$ and $D_{IB}$ may be utilized to derive an update scheme in a manner similar to that described above.

Moreover, some embodiments of the blind compensation module 12 may dynamically adjust the boundaries of the in-band and out-of-band regions as the blind compensation module 12 acquires more information about the signal y(k). For example, when the front-end 10 becomes operational, the blind compensation module 12 may know nothing about the received signal x(t) or the nonlinearly modified signal y(k). During operation, as the blind compensation module 12 trains and re-trains the LUT 44 with new blocks of samples and more becomes known about the nonlinearities of the signal y(k), an operator or a module may adjust the boundaries of in-band and out-of-band regions to include harmonics, for example. However, it will be noted that unlike the conventional approach to compensating for nonlinearities, the approach discussed above does not require any prior knowledge of the signal when the front-end 10 becomes operational.

In some embodiments, the blind compensation module 12 may additionally account for dynamic nonlinearities by generating a multi-dimensional version of the LUT 44 and retrieving compensation values based on past samples as well as on present samples. In particular, the blind compensation module 12 may generate a K-bit address into the LUT 44 according to the following scheme:
$$y(n) \mapsto i_n = 2^{K-1}b_{K-1} + 2^{K-2}b_{K-2} + \ldots + 2^0 b_0.$$

In other words, an address vector $b=[b_{K-1}\ b_{K-2}\ \ldots\ b_0]^T$ defines the mapping of a sample y(n) to a corresponding compensation factor $\delta(n)$. If all K bits $b_0, b_1, b_{K-1}$ are calculated using a single sample y(n), the blind compensation module 12 effectively treats the nonlinearity of the signal y(k) as static. To accommodate for dynamic nonlinearities, the blind compensation module 12 may concatenate one or more most significant bits (MSB) of the sample y(n) with one or more MSBs of the sample y(n−1) to form a total of K bits:

$$b = [\underbrace{b_{n,K-1}\ \ldots\ b_{n,K-k_1}\ b_{n-1,K-1}\ \ldots\ b_{n-1,K-k_2}}_{K}]^T,$$

where
$b_{n,k}$ corresponds to the $k^{th}$ bit corresponding to the sample y(n). It will be noted that the LUT 44 addressable by the vector b is, in a sense, a multi-dimensional look-up table.

By concatenating two or more sets of MSBs corresponding to multiple digitized samples, the blind compensation module 12 may compensate for memory effects of the front-end 10. Of course, the blind compensation module 12 may concatenate more than two addresses to accommodate longer memory effects. For example, a 32-bit address may be formed by concatenating the respective eight MSBs from four samples y(n), y(n−1), y(n−2), and y(n−3). Alternatively, 16 MSBs from each of the four samples y(n), y(n−1), y(n−2), and y(n−3) may be concatenated to form a 64-bit address, if the cost of memory is an acceptable trade-off for the given application. In general, a suitable amount of memory for a particular application may be determined empirically.

Figure 4:
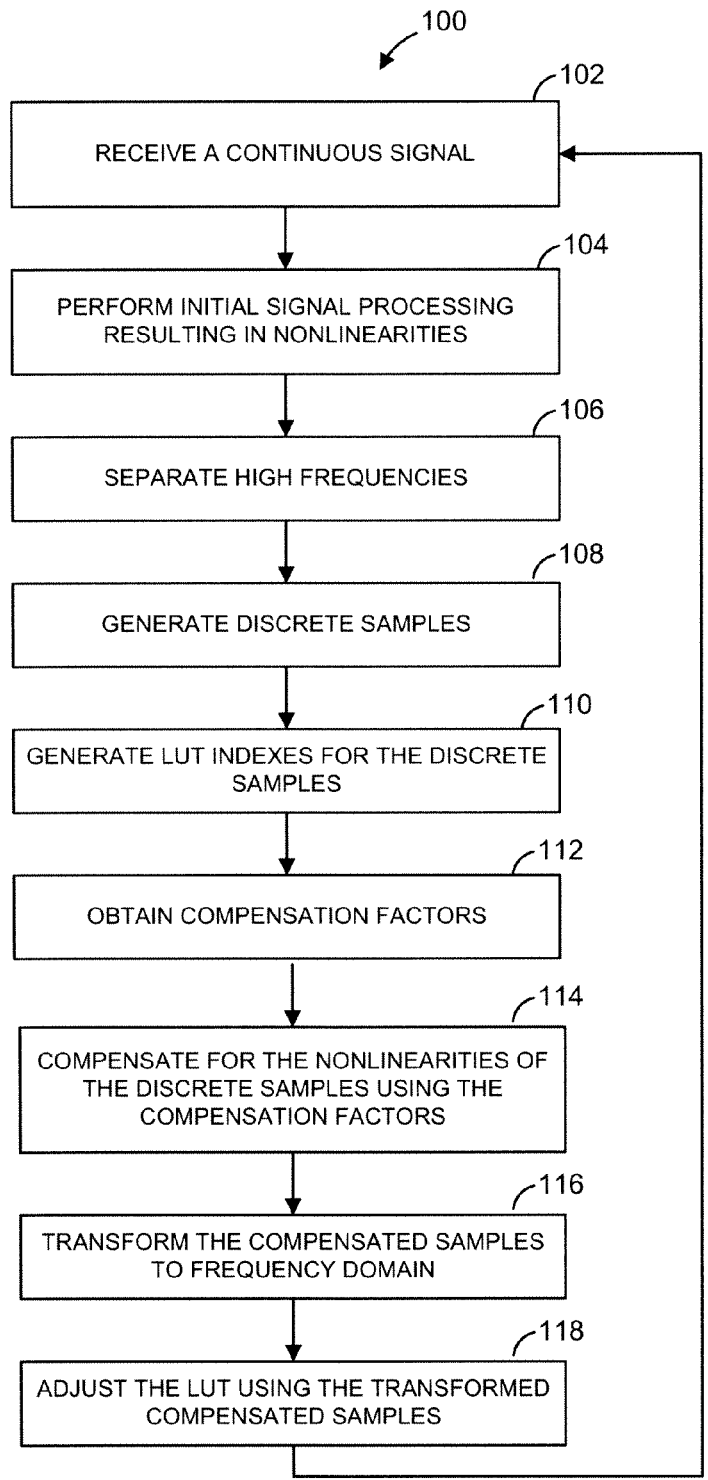
FIG. 4 is a flow diagram of an example method for compensating for nonlinearities in a received signal.

Referring specifically to FIG. 4, an example method 100 for compensating for arbitrary nonlinearities introduced into the received signal may begin in block 102, in which a signal is received. Referring back to FIGS. 1 and 3, for example, the received signal may be the continuous signal x(t) received by the antenna 14 of the front-end receiver system 10. In block 104, the received signal may be processed by a component such as the LNA 16 and/or the frequency mixer 20 illustrated in FIG. 1 and thereby acquire nonlinearities. In FIG. 3, the nonlinear transformation of the received signal is schematically illustrated as block 82.

If desired, some of the frequencies in the nonlinearly transformed signal may be separated in block 106. For example, the low-pass filter 24 (see FIG. 1) may attenuate frequency components above a certain threshold.

In block 108, the continuous nonlinearly transformed signal may be digitized (i.e., sampled or quantized) by an analog-to-digital converter such as the ADC 26, for example, to generate a sequence of signal samples. For the convenience of processing, the method 100 may further operate on the generated signal samples in blocks of preferably equal size. Next, in block 110, the method 100 may generate a memory address or a look-up table index for each of the signal samples obtained in block 108. In some embodiments, block 110 may additionally account for dynamic memory effects of the corresponding front end by generating indexes using several signal samples. For example, as discussed above with reference to FIG. 3, the method 100 may concatenate partial or full bit addresses of several samples to generate an index into a multi-dimensional look-up table.

In block 112, the method 100 may obtain the compensation values or, in some embodiments, complex compensation factors from a LUT using the indexes obtained in block 110. Then, in block 114, the method 100 may calculate the compensated signal samples using the signal samples obtained in block 108 and the compensation values retrieved in block 110. Referring back to FIG. 3, the acts of generating indexes, obtaining compensation values according to the indexes, and compensating for nonlinearities using these values may be performed by the components 42, 44, and 46, respectively.

Once the compensated signal samples are calculated, the method 100 may map these values to the frequency domain in block 116. For example, the method 100 may calculate a DCT of the block of compensated signal samples generated in block 114. In some embodiments or modes of operation, the transform function may be an FFT if the signal generated in block 104 has real and complex valued components. Next, in block 118, the method 100 may use the transformed compensated signal vector to adjust the look-up table and update, adjust, etc. some or all of the compensation values stored therein. To this end, the method 118 may use a cost function-based iterative technique based on in-band and out-of-band regions of the signal. More specifically, the LUT may be adjusted in an attempt to minimize the energy of the one or more out-of-band regions of the transformed compensated signal vector. At the same time, the LUT may be adjusted in an attempt to maintain the energy of the one or more in-band regions at a constant level to avoid attenuating valid signal data.

Generally with respect to FIGS. 1-3, the components or modules 12, 24. 26, and 42-52 may be implemented as hardware, software, firmware, or any combination of software, hardware, or firmware components. For example, some or all of the components may be implemented as one or more custom integrated circuits, application-specific integration circuits (ASICs), etc. Alternatively, some or all of the modules 42-52 may be software modules, stored in a computer-readable memory and executed on a processor. Other implementations of the modules 42-52 are also possible such as using a combination of hardware, software, and/or firmware. Further, it will be noted that some of the blocks of the exemplary procedure 100 such as blocks 110, 112, 114, 116, 118 may be implemented by one or several hardware or software components of the blind compensation module 12.

Additionally, it will be appreciated that the method and system for compensating for arbitrary nonlinearities can apply to complex valued IF signals output by a quadrature mixer as well as to real valued IF signals. In cases of complex valued IF signals, the transform function 48 may implement, for example, a Fast Fourier Transform (FFT) rather than the DCT transform discussed above.

As indicated above, methods of compensating for arbitrary nonlinearities in a received signal such as those described above may be utilized in various devices. For example, techniques such as described above may be utilized in base stations, radio or TV tuners, cell phones, access points, wireless routers, etc. FIGS. 5A-5F illustrate in more detail several devices in which the techniques described above may be employed.

Figure 5A:
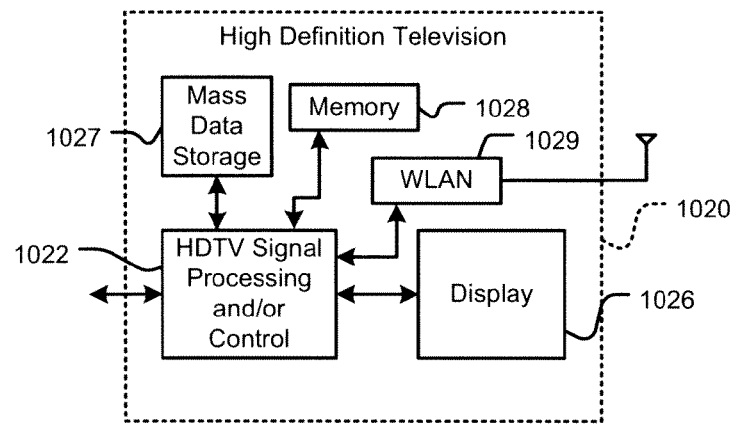
FIG. 5A is a block diagram of a high definition television that may utilize a method and system for compensating for nonlinearities in a received signal such as described herein.

Referring now to FIG. 5A, such techniques may be utilized in a high definition television (HDTV) 1020. HDTV 1020 includes a mass data storage 1027, an HDTV signal processing and control block 1022, a WLAN interface 1029 and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required. The signal processing and/or control circuit 1022 may implement the blind compensation techniques for arbitrary receiver nonlinearities such as described above.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement blind compensation techniques for arbitrary receiver nonlinearities such as described above.

Figure 5B:
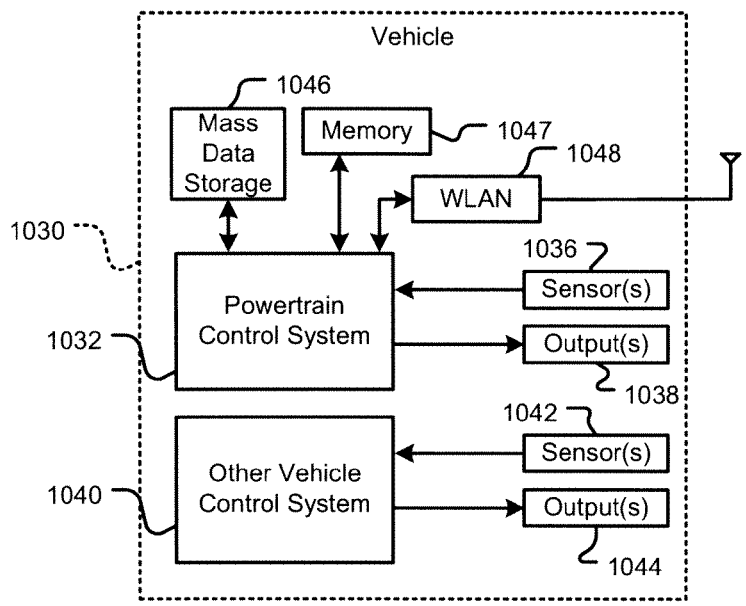
FIG. 5B is a block diagram of a vehicle that may utilize a method and system for compensating for nonlinearities in a received signal such as described herein.

Referring now to FIG. 5B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1046 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM. ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement blind compensation techniques for arbitrary receiver nonlinearities such as described above.

Figure 5C:
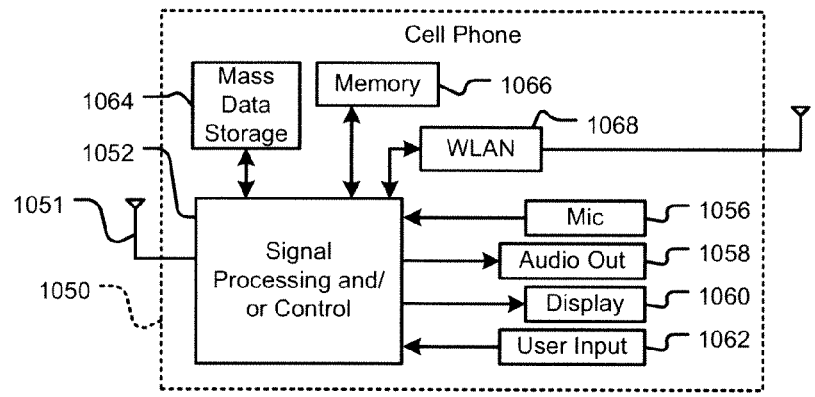
FIG. 5C is a block diagram of a cell phone that may utilize a method and system for compensating for nonlinearities in a received signal such as described herein.

Referring now to FIG. 5C, such techniques may be used in a cellular phone 1050 that may include a cellular antenna 1051. The cellular phone 1050 may include either or both signal processing and/or control circuits, which are generally identified in FIG. 5C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement blind compensation techniques for arbitrary receiver nonlinearities such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement blind compensation techniques for arbitrary receiver nonlinearities such as described above.

Figure 5D:
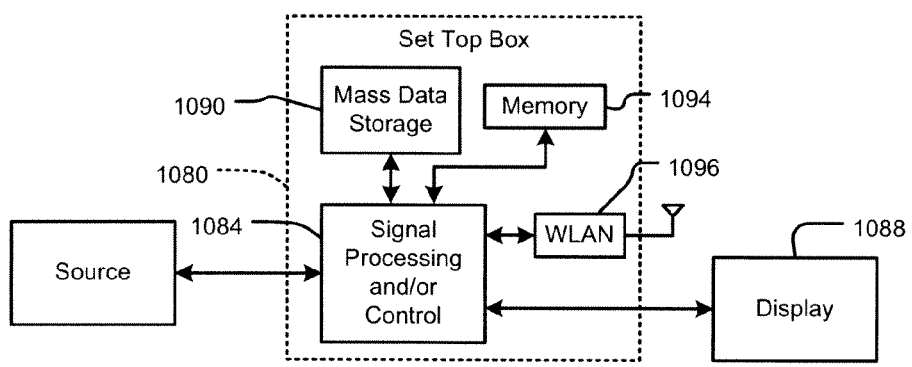
FIG. 5D is a block diagram of a set top box that may utilize a method and system for compensating for nonlinearities in a received signal such as described herein.

Referring now to FIG. 5D, such techniques may be utilized in a set top box 1080. The set top box 1080 may include either or both signal processing and/or control circuits, which are generally identified in FIG. 5D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement blind compensation techniques for arbitrary receiver nonlinearities such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement blind compensation techniques for arbitrary receiver nonlinearities such as described above.

Figure 5E:
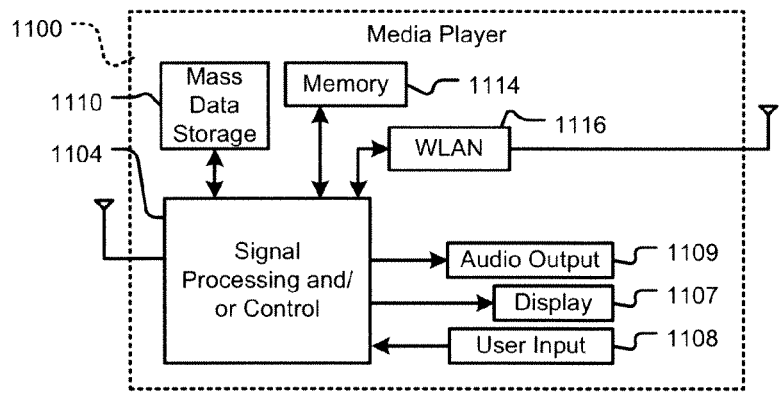
FIG. 5E is a block diagram of a media player that may utilize a method and system for compensating for nonlinearities in a received signal such as described herein.

Referring now to FIG. 5E, such techniques may be used in a media player 1100. The media player 1100 may include either or both signal processing and/or control circuits, which are generally identified in FIG. 5E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement blind compensation techniques for arbitrary receiver nonlinearities such as described above.

Figure 5F:
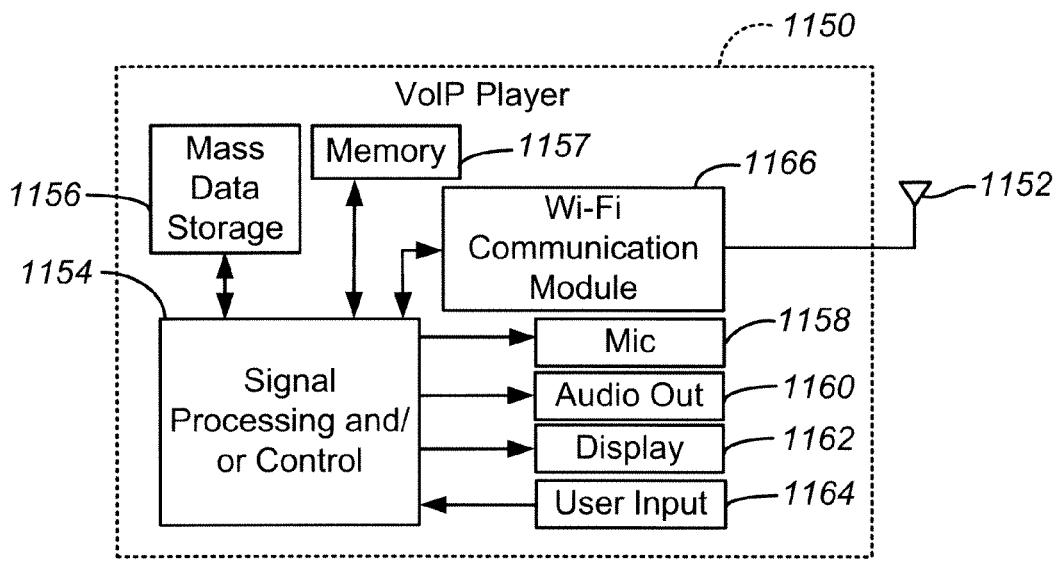
FIG. 5F is a block diagram of a voice-over-IP (VoIP) player that may utilize a method and system for compensating for nonlinearities in a received signal such as described herein.

Referring to FIG. 5F, such techniques may be utilized in a Voice over Internet Protocol (VoIP) phone 1150 that may include an antenna 1152. The VoIP phone 1150 may include either or both signal processing and/or control circuits, which are generally identified in FIG. 5F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement blind compensation techniques for arbitrary receiver nonlinearities such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media.

Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of compensating for arbitrary nonlinearities associated with a signal using a hardware device, the method comprising:
   receiving a plurality of samples of the signal having at least one in-band region and at least one out-of-band region, wherein the at least one out-of-band region corresponds to at least one undesired signal component that corresponds to nonlinearities in the signal;
   generating, using the hardware device, a plurality of compensated signal values based on applying a plurality of respective compensation values to the plurality of samples, wherein the compensated signal values correspond to the plurality of samples of the signal processed to reduce nonlinearities;
   applying, using the hardware device, a transform function to the plurality of compensated signal values to generate a frequency-domain representation of the plurality of compensated signal values; and
   updating, using the hardware device, at least one of the plurality of compensation values using the generated frequency-domain representation to reduce energy associated with the at least one out-of-band region of the signal, wherein updating at least one of the plurality of compensation values includes:
   obtaining a first subset of values of the frequency-domain representation corresponding to the at least one in-band region;
   obtaining a second subset of values of the frequency-domain representation corresponding to the at least one out-of-band region; and
   iteratively adjusting at least one of the plurality of compensation values based on the first subset of values and the second subset of values.

2. The method of claim 1, wherein updating at least one of the plurality of compensation values includes maintaining energy associated with the in-band region of the signal.

3. The method of claim 1, wherein updating at least one of the plurality of compensation values further includes:
   obtaining an in-band transform vector based on the first subset of values of the frequency-domain representation corresponding to the at least one in-band region;
   obtaining an out-of-band transform vector based on the second subset of values of the frequency-domain representation corresponding to the at least one out-of-band region;
   wherein iteratively adjusting at least one of the plurality of compensation values is based on the out-of-band transform vector and the in-band transform vector.

4. The method of claim 1, wherein iteratively adjusting at least one of the plurality of compensation values iteratively adjusting comprises:
   determining at least one adjustment value based on the first subset of values and the second subset of values; and
   adding the at least one adjustment value to the corresponding at least one of the plurality of compensation values.

5. The method of claim 1, wherein generating a plurality of compensated signal values includes generating a compensated signal value s according to $s=(1+\delta)y$, wherein y is a sample of the signal and $\delta$ is the respective compensation value.

6. The method of claim 1, wherein the transform function is a Discrete Cosine Transform (DCT).

7. The method of claim 1, wherein the transform function is a Fast Fourier Transform (FFT).

8. The method of claim 1, wherein the in-band region is a contiguous region.

9. The method of claim 1, wherein the in-band region is a non-contiguous region.

10. The method of claim 1, wherein the out-of-band region corresponds to one or more bands corresponding to one or more harmonics of the signal.

11. The method of claim 1, wherein the signal is a complex valued signal.

12. The method of claim 1, further comprising:
   generating a plurality of table indexes using the plurality of samples, wherein each of the plurality of tables indexes corresponds to a respective one of the plurality of samples; and
   retrieving a corresponding compensation value from a look-up table using each of the plurality of table indexes.

13. The method of claim 12, wherein generating the plurality of table indexes using the plurality of samples includes, for each of the plurality of table indexes:
   generating a first sequence of bits from a first one of the plurality of samples;
   generating a second sequence of bits from a second one of the plurality of samples; and
   concatenating a subset of the first sequence of bits with a subset of the second sequence of bits to form the table index.

14. The method of claim 13, wherein the subset of the first sequence corresponds to one or more most significant bits of the first sequence and wherein the subset of the second sequence corresponds to one or more most significant bits of the second sequence.

15. The method of claim 1, wherein no compensation value is updated more than once during a single iteration of updating.

16. The method of claim 1, wherein none of the plurality of compensation values is trained using a training signal.

17. The method of claim 1, further comprising generating the plurality of samples of the signal.

18. An apparatus, comprising:
a compensator to apply a plurality of compensation values to a block of signal samples to generate a block of compensated signal samples, wherein the block of compensated signal values corresponds to the block of signal samples of the signal processed to reduce nonlinearities; and
an update module to adjust the plurality of compensation values based on the block of compensated signal samples to minimize energy of the compensated signal samples in an out-of-band region while maintaining energy of the compensated signal samples in an in-band region, wherein the out-of-band region corresponds to at least one undesired signal component that corresponds to nonlinearities in the signal, wherein the update module is configured to:
obtain a first subset of values of the frequency-domain representation corresponding to the at least one in-band region;
obtain a second subset of values of the frequency-domain representation corresponding to the at least one out-of-band region; and
iteratively adjust at least one of the plurality of compensation values based on the first subset of values and the second subset of values.

19. The apparatus of claim 18, wherein the compensator includes:
a memory to store a look-up table including the plurality of compensation values;
an operator coupled to memory to apply the plurality of compensation values to the block of signal samples; and
wherein the update module is coupled to the memory.

20. The apparatus of claim 18, further comprising an address generator to generate an index into the look-up table based on at least one of the signal samples in the block of signal samples.

21. The apparatus of claim 20, wherein the address generator is configured to generate the index based on a plurality of digitized samples associated with the block of signal samples.

22. The apparatus of claim 18, further comprising an analog-to-digital converter (ADC) to receive an analog signal and to generate the signal samples.

23. The apparatus of claim 22, further comprising a low-pass filter coupled to an output of the ADC.

24. The apparatus of claim 22, further comprising a mixer coupled to an input of the ADC.

25. The apparatus of claim 24, further comprising a low noise amplifier coupled to an input of the mixer.

26. The apparatus of claim 25, further comprising an antenna coupled to an input of the low noise amplifier.

27. The apparatus of claim 18, wherein the signal corresponds to a received wireless signal.

28. An apparatus, comprising:
means for applying a plurality of compensation values to a plurality of respective signal samples to generate a plurality of compensated signal samples, wherein the compensated signal values correspond to the plurality of respective signal samples processed to reduce nonlinearities; and
means for adjusting the plurality of compensation values using the plurality of compensated signal samples to minimize energy of the compensated signal samples in an out-of-band region while maintaining energy of the compensated signal samples in an in-band region, wherein the at least one out-of-band region corresponds to at least one undesired signal component that corresponds to nonlinearities in the signal, wherein the means for adjusting the plurality of compensation values is configured to:
obtain a first subset of values of the frequency-domain representation corresponding to the at least one in-band region;
obtain a second subset of values of the frequency-domain representation corresponding to the at least one out-of-band region; and
iteratively adjust at least one of the plurality of compensation values based on the first subset of values and the second subset of values.

29. The apparatus of claim 28, further comprising:
storing means for storing a look-up table including the plurality of compensation values; and
compensating means coupled to the storing means for applying the plurality of compensation values to the plurality of signal samples.

30. The apparatus of claim 29, further comprising means for generating an index into the look-up table based on at least one of the plurality of signal samples.

31. The apparatus of claim 28, further comprising:
receiving means for receiving an analog signal; and
means coupled to the receiving means for generating the plurality of signal samples; wherein the plurality of signal samples are digitized signal samples.

* * * * *